United States Patent Office 2,790,330
Patented Apr. 30, 1957

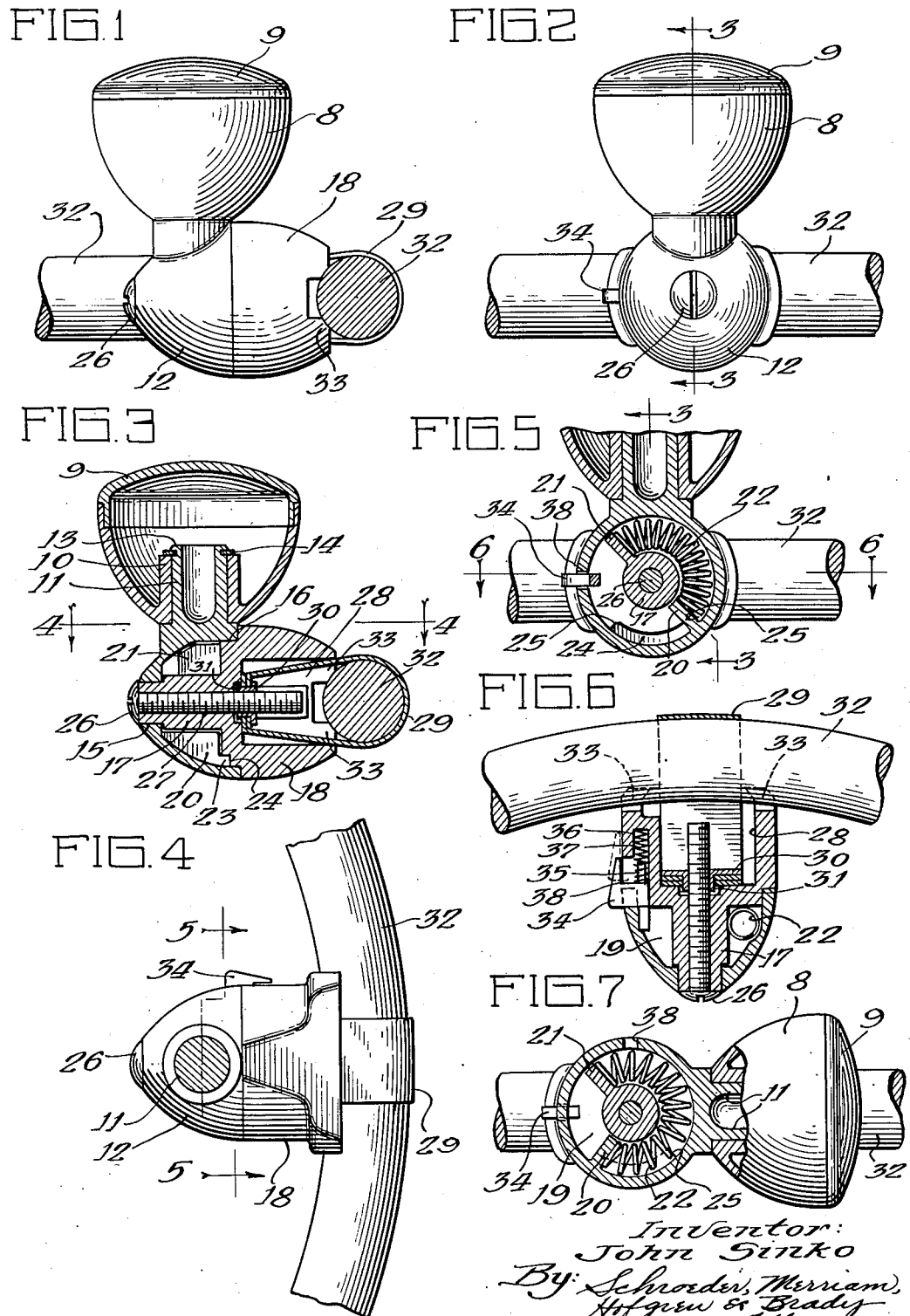

2,790,330

STEERING WHEEL SPINNER

John Sinko, Chicago, Ill.

Application December 30, 1953, Serial No. 401,125

4 Claims. (Cl. 74—557)

This invention relates to steering wheel spinners, and more particularly to spinners which may be turned to an inoperative position when not in use.

The primary object of the present invention is to provide a new and improved steering wheel spinner capable of oscillation between operative position and inoperative position.

Another object is to provide a spinner having a compression spring normally urging the spinner knob toward inoperative position.

A further object is to provide a spinner of shortened axial length so that the spinner knob will lie closer to the rim of the steering wheel when mounted.

Still another object is to provide a new and improved latch mechanism which automatically locks the spinner in its operative position.

Another object is to provide abutting faces in the housing which will contact a shoulder on the knob base to limit movement of the knob in both directions.

The invention is illustrated in the preferred embodiment in the accompanying drawings, in which:

Fig. 1 is a side elevational view of the spinner mounted on a steering wheel and in upright position;

Fig. 2, an end elevational view of the spinner in upright position;

Fig. 3, a sectional view taken as indicated on line 3—3 of Fig. 2 and Fig. 5;

Fig. 4, a sectional view taken as indicated on line 4—4 of Fig. 3;

Fig. 5, a fragmentary sectional view taken as indicated on line 5—5 of Fig. 4;

Fig. 6, a sectional view taken as indicated on line 6—6 of Fig. 5; and

Fig. 7, a broken end elevational view, partly in section, showing the spinner in its inoperative position.

In the embodiment illustrated, a spinner knob 8, usually made of plastic, and provided with a decorative cap member 9, has inwardly projecting circular side walls 10 which are slidably received upon a projecting cylindrical portion 11 of a knob base 12. The knob is free for rotation, and it is retained upon the cylindrical portion 11 by an outwardly bent lip 13 which maintains the washer 14 in place over the top of the side walls 10 and about the narrowed neck of the cylindrical portion 11.

The hollow knob base 12 has a pair of spaced bearings 15 and 16 which are journalled upon a hollow trunnion 17 of a housing member 18 to permit movement of the knob base between operative and inoperative position. The trunnion 17 and the knob base 12 are shaped so that they leave a circular recess 19 between them into which a shoulder 20 on the knob base 12 and a shoulder 21 on the housing member 18 project axially of the trunnion 17. A compression spring 22 is arcuately disposed in the recess 19 between the pair of shoulders 20 and 21, and by turning the knob base between operative and inoperative positions, the shoulder 20 approaches and recedes from the shoulder 21 which, in turn, alternately compresses and releases the spring 22.

In the embodiment shown, the oscillatory movement of the knob base is limited in both directions by a projecting finger 23 on the shoulder 20 which rides in an arcuate channel 24 formed in the housing member 18 and strikes the abutting faces 25 in either end of the channel 24, as the knob 8 is moved from operative to inoperative position.

As best shown in Fig. 3, the knob base 12 is held in position upon the hollow trunnion 17 by the head of a machine screw 26 which traverses a bore 27, common to both the trunnion 17 and the housing member 18, and extends into a large cavity 28 in the housing member where it engages the ends of a flexible clamping band 29. The ends of the clamping band are perforated to receive the screw 26. A nut 30 is secured to the inner face of one end of the band, and has a small boss 31 adapted to extend into the aperture of the other end of the band to facilitate alignment of the ends to receive the screw. This compact structure shortens the axial length of the spinner, and permits the knob 8 to be positioned closer to the rim 32 of the steering wheel.

To mount the spinner upon a steering wheel, the screw 26 is turned to disengage the rectangular nut 30. The band is then wrapped around the steering wheel rim and one end of the band has its aperture snapped over the boss 31. The ends of the band are then thrust into the cavity 28. By turning the screw 26, the band pulls the gripping portions 33 on the housing 18 into firm engagement with the inner side of the rim.

A latch 34, preferably made of plastic, is mounted on the housing 18 for slidable movement axially of the spinner to lock the knob base 12 in operative position against the compression of the spring 22. The latch has a pin 35 which projects into a well 36 in the housing 18 where it is encircled by a latch spring 37 yieldably urging the latch out of the well 36. When the spinner is turned up to operative position, the latch 34 snaps into notch 38 in the knob base 12.

Normally the spinner is maintained under spring pressure in inoperative position in the plane of the steering wheel, as shown in Fig. 7. To place the spinner in condition for use, the knob is merely turned counterclockwise to operative upright position, as shown in Figs. 1 and 2. By sliding the latch 34 from the notch 38, the knob is turned to inoperative position by the compression spring 22.

The foregoing detailed description is given for clearness of understanding only and no unnecessary limitations should be understood therefrom, for some modifications will be obvious to those skilled in the art.

I claim:

1. A steering wheel spinner having an operative and an inoperative position, comprising: a housing member having a hollow trunnion on which a knob base may be mounted for oscillatory movement, said housing having a cavity in axial alignment with the opening in said trunnion to receive the ends of a clamping band, and said housing having an axially disposed shoulder; a hollow knob base having a pair of spaced bearings journalled on the trunnion and affording a circular recess between said bearings, one of said bearings having an axially disposed notch, and said knob base having a shoulder extending into said recess; a compression spring arcuately disposed in said recess between said shoulders normally to urge said spinner toward one of its positions; a knob journalled on said knob base; and a latch slidably mounted on said housing member and yieldingly urged axially of the housing member into engagement with said notch.

2. A steering wheel spinner as specified in claim 1, in which movement of the knob to operative position advances the shoulder on the knob base toward the shoulder on the housing to compress the interposed spring, said knob being releasably locked in operative position by the engagement of the latch and the notch.

3. A steering wheel spinner as specified in claim 1, in which the shoulder on the knob base has an axially projecting finger, and an arcuate channel formed in the housing opens outwardly into the circular recess to receive said finger, said channel having closed ends forming a pair of stops for said finger to limit the movement of the knob base.

4. A steering wheel spinner as specified in claim 1, in which the knob base has an opening in axial alignment with the opening in the trunnion, a cap screw extends through said axially aligned openings into the cavity in the housing to maintain the knob base upon the trunnion, and a clamping band having a pair of apertured ends impaled by said screw, one of said ends being provided with a threaded boss adapted to project into the aperture in the other end of said band.

References Cited in the file of this patent
UNITED STATES PATENTS

| | | |
|---|---|---|
| 1,314,995 | Whigam | Sept. 2, 1919 |
| 2,058,431 | Eshenbacher | Oct. 27, 1936 |
| 2,561,961 | White | July 24, 1951 |